Jan. 14, 1958  H. W. ACKERMAN, JR  2,819,984
REGENERATED CELLULOSE PACKAGING MATERIALS
AND PROCESS OF MAKING SAME
Filed Nov. 22, 1954
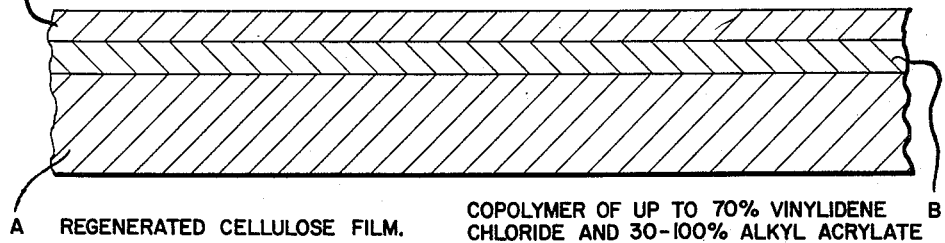
C  COPOLYMER OF 80-97 % VINYLIDENE CHLORIDE
AND 3-20% OF POLYMERIZABLE MONO-OLEFIN-
IC MONOMER.
A  REGENERATED CELLULOSE FILM.
COPOLYMER OF UP TO 70% VINYLIDENE  B
CHLORIDE AND 30-100% ALKYL ACRYLATE
INVENTOR
HERVEY WINFIELD AcKERMAN, JR.
BY
ATTORNEY United States Patent Office 2,819,984
Patented Jan. 14, 1958

2,819,984

REGENERATED CELLULOSE PACKAGING MATERIALS AND PROCESS OF MAKING SAME

Hervey Winfield Ackerman, Jr., Grand Island, N. Y., assignor to E. I. du Pont de Nemours and Company, Wilmington, Del., a corporation of Delaware Application November 22, 1954, Serial No. 470,551

12 Claims. (Cl. 117—76)

This invention relates to the manufacture of regenerated cellulose film. More particularly, it relates to the production of regenerated cellulose films that are transparent, moistureproof, heat-sealable, durable and highly flexible; in short, improved regenerated cellulose packaging films suitable for conversion to bags, containers and similar packages.

The desired properties for transparent packaging materials are well known. They include strength, heat-sealability, durability of the heat-seal, flexibility and durability of the complete film, moistureproofness, high gloss and clarity. Clarity, heat-sealability and moistureproofness have been achieved and have contributed to making regenerated cellulose films important in the packaging field. These properties have been obtained by the use of coatings developed by the industry; one type of coating to render the films heat-sealable and enable packages to be formed, another type to render the packages moistureproof, and still others to adhere the previously mentioned coatings to the base film of regenerated cellulose. Then, as described in U. S. Patent 2,570,478, a process was developed to achieve heat-sealability, moistureproofness, adherence and other properties by the use of a single coating. However, despite the wealth of activity in this field, the durability and flexibility of regenerated cellulose films still leave much to be desired. The inability of the films to withstand the normal abuse of shipping and handling make handling goods wrapped in the films difficult and expensive.

The object of the present invention is to provide a novel packaging film of regenerated cellulose displaying high flexibility and excellent durability as well as moistureproofness, heat-sealability and clarity. A further object is to prescribe a process for preparing these improved regenerated cellulose packaging films.

The objects of the invention are achieved by providing a base film of regenerated cellulose having at least one surface coated with two special coatings:

(1) A subcoating comprising a copolymer obtained by polymerizing up to 70% vinylidene chloride and 30–100% of an alkyl acrylate wherein the alkyl group contains at least 2 carbon atoms.

(2) A top coating comprising a copolymer obtained by polymerizing 80–97% vinylidene chloride and 3–20% of a polymerizable mono-olefinic monomer copolymerizable therewith, preferably selected from the group consisting of acrylonitrile and alkyl acrylate.

The accompanying drawing illustrates in a cross-sectional view the novel packaging film of this invention. In the drawing the legend A identifies the base film of regenerated cellulose, and legend B and C indicate respectively, the subcoating (1), and the top-coating (2) above described.

Preferably, the subcoating comprises a copolymer obtained from 40–70% of vinylidene chloride, 30–60% of an alkyl acrylate, and 0.5%–3% by weight, based upon the total weight of the previous two components, of an unsaturated aliphatic acid from the group consisting of acrylic, methacrylic, and itaconic acids, and the top coating comprises a copolymer obtained from 90–97% vinylidene chloride, 3–10% of an alkyl acrylate, and 0.5%–3% by weight, based upon the total weight of the previous two components, of an unsaturated aliphatic acid from the group consisting of acrylic, methacrylic and itaconic acids.

In a specific embodiment of this invention, a base film of regenerated cellulose was coated with the two special coatings. The coatings were applied as dispersions prepared by adding "Duponol" WAQ[1], "Sulframin" AB[2], ammonium persulfate, itaconic acid and water to a vessel fitted with a stirrer and a reflux condenser. After dissolving these components by stirring, vinylidene chloride and the alkyl acrylate were introduced and the mixture refluxed at 35° C. A solution of metasodium bisulfite was added and the mixture stirred until refluxing ceased, thereby indicating completion of polymerization. A quantity of "Duponol," e. g., 7.3 pounds of "Duponol" WAQ for the charge given below or 2.25 pounds of "Sulframin" AB in water may be added subsequent to polymerization to stabilize the copolymer against coagulation.

The subcoating containing a copolymer of approximately 70% vinylidene chloride, 30% 2-ethylhexyl acrylate and 2%, based on the total weight of the previous two components, of itaconic acid was prepared from the following charge:

Water _____ 240 lbs.
"Duponol" WAQ_____ 7.3 lbs.
Ammonium persulfate_____ 152 grams.
Vinylidene chloride_____ 79 lbs.
2-ethylhexyl acrylate_____ 33 lbs.
Itaconic acid_____ 2.24 lbs.
Meta-sodium bisulfite_____ 76 grams in 1.5 lbs. of water.

Added subsequent to polymerization:

"Sulframin" AB_____ 2.25 lbs. in 10 lbs. of water.

The top coat containing a copolymer of 94% vinylidene chloride, 6% methyl acrylate and 2%, based on the total weight of the previous two components, of itaconic acid was prepared from the following charge:

Water _____ 120 lbs.
"Duponol" WAQ_____ 10 lbs.
Ammonium persulfate_____ 102 grams.
Vinylidene chloride_____ 140 lbs.
Methyl acrylate_____ 9 lbs.
Itaconic acid_____ 3 lbs.
Meta-sodium bisulfite_____ 51 grams in 1.5 lbs. of water.

Added subsequent to polymerization:

"Sulframin" AB_____ 3 lbs. in 10 lbs. of water.

A base film .0014" thick was prepared substantially according to U. S. Patent 2,159,007 with 20% ethylene glycol used as a softener. The film was subcoated by passing it through a bath of the first dispersion. Contact time with the dispersion was kept at a minimum. Excess dispersion was removed with doctor rolls to bring the coating to the desired thickness. The single-coated film was then dried in an atmosphere maintained at a temperature between 120° C. and 145° C. The top coating was then applied, smoothed and dried in a similar manner. The coating weight of the film totaled 6.5 grams/square meter; 3 grams of subcoat and 3.5 grams of top coat.

---

[1] Sodium salt of a fatty alcohol sulfate in aqueous solution (33% active ingredient).
[2] Sodium salt of an alkyl benzene sulfonate.

In the following table the properties of the resulting film are compared to those of the single coated film:

TABLE I

| Film | Water vapor permeability (grams/100 sq. meters/hour) | Heat-seal strength (grams/1.5 in.) | Durability,[1] as measured by a stress-flex test (strokes) |
| --- | --- | --- | --- |
| Single-coated | 75 | 500 | 10 |
| Double-coated | 75 | 882 | 125 |

[1] Conditioned at 75° F. and 35% relative humidity.

The details of the methods for testing the films follow:

Coating weight is determined by soaking the coated film in a hot solution of a sodium alkyl aryl sulfonate in acetic acid and stripping the coating from the regenerated cellulose film. The stripped coating in the form of a thin film is dried and weighed.

Moisture or water vapor permeability is determined by placing the test film over the top of an aluminum cup containing 15 milliliters of water, the test area being 33.3 square centimeters. The assembly is weighed accurately and then placed in a dry (less than 3% relative humidity) air-swept oven at 39.5° C. for 24 hours. The assembly is removed from the oven, cooled to room temperature and reweighed. The weight loss is converted to grams of water lost/100 square meters/hour.

Heat-seal strength is measured by cutting a piece of the coated film 4" x 10" with the grain running in the long or machine direction into two pieces 4" x 5" each. The two pieces are superimposed so that opposite surfaces are in contact. The two pieces of superimposed film are then sealed together at each end at right angles to the grain. A ¾" wide sealing bar heated to a temperature of 150° C. at 20 p. s. i. pressure contacts the ends for 2 seconds. The sealed sheets are then cut in half at right angles to the grain. From the center of the four resulting pieces, 1½" wide strips parallel to grain are cut. After conditioning at 35% relative humidity and 75° F. for 72 hours, the four sets of strips are tested by opening each set of strips at the free ends, placing them in a Suter testing machine and pulling them apart. The highest force in grams required to pull the strips apart is taken as a measure of the heat-seal bond strength.

Durability is measured by the stress-flex test. The object of this test is to simulate the actual abuse suffered by the film during handling. Twenty pieces of film 4" x 7", the 7" dimension running in the machine direction of the film, are cut. After conditioning at 35% relative humidity and 75° F. for 72 hours, they are inserted between rubber faced clamps, the 7" dimension running parallel to the jaws of the clamps. One clamp is stationary and the opposite clamp is weighted and permitted to move in a plane parallel to the plane of the film by rotating the apparatus. The number of strokes recorded before the sample breaks is termed the stress-flex value and is a direct measure of the film's durability.

The following examples illustrate the process and present the properties of the film of this invention. Examples 1, 17 and 18 are outside the scope of the invention and are presented for comparison.

The films were prepared essentially in the manner described previously. The base film of regenerated cellulose was unwound from a roll, passed over a tensioning roll and under a guide roll into a tank containing the coating composition. The coated film was then passed between two "doctor" rolls to smooth the coating and to regulate its thickness. The coated film was dried in a tower maintained at a temperature between 120° C.–145° C.

The coating compositions were prepared substantially as described for the specific embodiment. The amounts of polymer components were varied as disclosed in the examples and they are given in weight percentages. The percentages of acid (itaconic, acrylic or methacrylic) are based on the total weight of the major components. Thus, to prepare a copolymer from 70% vinylidene chloride, 30% alkyl acrylate and 2% itaconic acid using 70 pounds of vinylidene chloride, one employs 30 pounds of alkyl acrylate and 2 pounds of itaconic acid. Unless otherwise stated, the regenerated cellulose base films were prepared in accordance with U. S. Patent 2,533,557 and contained approximately 0.5% by weight of a guanidine-urea-formaldehyde resin.

*Example 1*

This example illustrates the single coated film and is presented for comparison purposes. It is not within the scope of the invention.

A regenerated cellulose film containing 20% ethylene glycol was coated at the rate of 5 grams of solids per square meter with an aqueous dispersion containing a copolymer obtained from 94% vinylidene chloride and 6% methyl acrylate and 2% itaconic acid. The coated film was dried in air at 120–145° C. for 20 seconds.

The moisture permeability was 75 grams/100 square meters per hour. The heat-seal bonding strength was 500 grams/1.5 inches. The durability, as measured by the stress-flex test, was 10 strokes.

*Examples 2 and 3*

In these examples, regenerated cellulose film containing 20% ethylene glycol was coated with a subcoat of an aqueous dispersion containing a copolymer obtained from 70% vinylidene chloride, 30% 2-ethylhexyl acrylate and 2% itaconic acid and a top coat of an aqueous dispersion containing a copolymer obtained from 94% vinylidene chloride, 6% methyl acrylate and 2% itaconic acid. In Example 2, the subcoat was applied at the rate of 3 grams per square meter and the top coat was applied at the rate of 3.5 grams per square meter. In Example 3, the subcoat was applied at the rate of 2.5 grams per square meter and the top coat was applied at the rate of 6.5 grams per square meter.

The following properties were obtained:

| Example No. | Water vapor permeability (grams/100 sq. meters/hr.) | Heat-seal strength (grams/1.5 in.) | Durability (strokes) |
| --- | --- | --- | --- |
| 2 | 75 | 882 | 125 |
| 3 | 75 | 474 | 112 |

*Examples 4 and 5*

Example 2 was rerun twice using identical dispersions except for the substitution of acrylic acid in Example 4 and methacrylic acid in Example 5 for itaconic acid. The results were substantially the same as those reported in Example 2.

*Example 6*

In this example, the subcoating contained no acid. The resin-impregnated regenerated cellulose film was coated with a subcoating of a copolymer from 70% vinylidene chloride and 30% 2-ethylhexyl acrylate dispersed in water. The subcoated film was dried and the top coating was applied. The top coating contained a copolymer from 94% vinylidene chloride, 6% methyl acrylate and 2% itaconic acid.

The resulting film displayed a water permeability of about 90 grams/100 square meters/hour, a heat-seal bond strength of 720 grams/1.5 inches and a durability of 164 strokes.

*Example 7*

A regenerated cellulose film containing no resin was coated with the same two coatings as described for Example 6. The resulting film displayed a water permeability of 80 grams/100 square meters/hour, a heat-seal bond strength of 260 grams/1.5 inches and a durability of 203 strokes.

*Examples 8 and 9*

In these examples, the regenerated cellulose film was coated with a subcoat of an aqueous dispersion containing a copolymer from 60% vinylidene chloride, 40% 2-ethylhexyl acrylate and 2% itaconic acid and a top coat of an aqueous dispersion containing a copolymer from 94% vinylidene chloride, 6% methyl acrylate and 2% itaconic acid. In Example 8, both coats were applied at the rate of 5 grams per square meter. In Example 9, the subcoat was applied at the rate of 6 grams per square meter and the top coat was applied at the rate of 5 grams per square meteer.

The following properties were obtained:

| Example No. | Heat-seal strength (grams/1.5 inches) | Durability (strokes) |
| --- | --- | --- |
| 8 | 880 | 170 |
| 9 | 670 | 150 |

*Example 10*

Regenerated cellulose film was coated with a subcoat of an aqueous dispersion containing a copolymer from 50% vinylidene chloride, 50% 2-ethylhexyl acrylate and 2% itaconic acid and a top coat of the aqueous dispersion described in Example 9. The subcoat weight was 3.0 grams/square meter and the top coat weight was 6.8 grams/square meter.

The resulting film had a heat-seal strength of 600 grams per 1.5 inches and a durability value of 154 strokes.

*Example 11*

Regenerated cellulose film was coated with a subcoat of an aqueous dispersion containing a copolymer from 40% vinylidene chloride, 60% 2-ethylhexyl acrylate and 3% itaconic acid and a top coat of the aqueous dispersion described in Example 9. The subcoat weight was 1.0 gram/square meter and the top coat weight was 6.6 grams/square meter.

The resulting film had a heat-seal strength of 330 grams per 1.5 inches and a durability rating of 105 strokes.

*Example 12*

Regenerated cellulose film was coated with a subcoat of an aqueous dispersion containing poly(2-ethylhexyl acrylate) and a top coat of the aqueous dispersion described in Example 9. The subcoat weight was 4.4 grams/square meter and the top coat weight was 2.9 grams/square meter.

The resulting film had a heat-seal strength of 70 grams per 1.5 inches and a durability rating of 61 strokes.

*Example 13*

This example is the same as Example 12 except that the subcoat was modified with 3% itaconic acid. The subcoat weight was 1.5 grams/square meter and the top coat weight was 4.8 grams/square meter.

The resulting film had a heat-seal strength of 220 grams per 1.5 inches and a durability rating of 90 strokes.

*Example 14*

Regenerated cellulose film was coated with a subcoat of an aqueous dispersion containing poly(isobutyl acrylate) modified with 3% itaconic acid and a top coat of the aqueous dispersion described in Example 9. The subcoat weight was 1.7 grams/square meter and the top coat weight was 4.9 grams/square meter.

The resulting film had a heat-seal strength of 220 grams per 1.5 inches and a durability rating of 127 strokes.

*Example 15*

In this example, the two coatings used in the process of this invention were not applied from aqueous dispersions. Instead, they were first dissolved in organic solvents before being applied.

The regenerated cellulose film was prepared by passing the film through a glycol softening bath containing an aqueous solution of a guanidine-urea-formaldehyde resin to incorporate into the film 0.5% by weight of the resin. The regenerated cellulose film containing the resin was coated first with a solution of the copolymer from 60% vinylidene chloride, 40% 2-ethylhexyl acrylate and 2% itaconic acid in a solvent consisting of 10% cyclohexanone and 90% methyl ethyl ketone; the solution containing a total of 10% solids. After the subcoating was substantially dry and free of solvent the top coating was applied. It contained a copolymer from 90% vinylidene chloride and 10% acrylonitrile dissolved in the same solvent as the subcoating. The solution contained 10% by weight of solids and 10% by weight (10% of solids) of dibutyl phthalate as a plasticizer. The subcoating was applied at the rate of 6 grams per square meter and the top coating was applied at the rate of 26 grams per square meter.

The resulting film displayed the following properties: a moisture permeability of 44 grams/100 square meter/hour, a heat-seal bond strength of over 600 grams/1.5 inch and a durability of 133 strokes.

*Example 16*

The above example was repeated except that itaconic acid was omitted from the subcoating. The resulting film displayed physical properties substantially identical to those of Example 15.

*Examples 17 and 18*

These examples depict the critical nature of the composition specified for the subcoating. They are outside the scope of the invention. In Example 17, a subcoating was prepared by forming an aqueous dispersion containing a copolymer obtained from 85% vinylidene chloride, 15% 2-ethylhexyl acrylate, and 2% itaconic acid. In Example 18, the subcoating was an aqueous dispersion containing a copolymer from 96% vinylidene chloride, 4% methyl acrylate and 2% itaconic acid. The top coatings in both examples were applied as aqueous dispersions containing a copolymer from 94% vinylidene chloride, 6% methyl acrylate and 2% itaconic acid. The subcoatings and top coatings in both examples were applied at the rate of 6 grams per square meter.

The heat-seal strengths for both resulting films were comparable to the heat-seal strengths of the films of the present invention; 750 for Example 17 and 480 for Example 18. However, the durability of these films was abnormally low; 9 strokes for Example 17 and 14 strokes for Example 18.

From the foregoing examples it is evident that a wide variety of materials may enter the preparation of the regenerated cellulose film. The film may or may not be resin-impregnated. It may contain softeners or other constituents such as pigments, dyes, delustrants, plasticizers, etc. if desired. The important concept here and the one basic to this invention resides in the use of two critical coatings, namely; a subcoating comprising a copolymer obtained from up to 70% by weight of vinylidene chloride and 30–100% by weight of an alkyl acrylate, wherein the alkyl group contains at least 2 carbon atoms and a top coating comprising a copolymer obtained from 80–97% vinylidene chloride and 3–20% of a polymerizable monomer.

The alkyl acrylate in the subcoating contributes to the elasticity of the subcoating. The amount of this component necessary to give an ultimate heat-seal of satisfactory strength and durability is dependent upon the particular alkyl acrylate used.

The moisture impermeability of the film of this invention is contributed by the top coating composition; a hard polymer prepared from at least 80% vinylidene chloride and 3–20% of at least one other polymerizable monoolefinic monomer copolymerizable therewith. As polymerizable monomers for use with the vinylidene chloride in the top coating, we have illustrated the use of an alkyl acrylate and acrylonitrile. However, the invention is not limited to these. Any monomer which will copolymerize with vinylidene chloride may also be used. The list includes: Methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or mono-alkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U. S. Patent 2,160,943.

These compounds may be described as vinyl or vinylidene compounds having a single "$CH_2=C<$" group. The most useful ones fall within the general formula

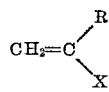

where R may be hydrogen, a halogen or a saturated aliphatic radical and X is selected from one of the following groups:

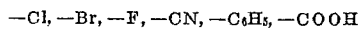

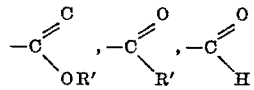

—$OC_6H_5$, —$CONH_2$, —$CONH-R'$, and —$CONR'_2$, in which R' is alkyl.

The coatings may be applied in the form of aqueous dispersions or from solutions of the polymers in organic solvents. As shown in the examples, unsaturated aliphatic acids such as itaconic acid, acrylic acid and methacrylic acid are advantageously added to the coating compositions in either aqueous dispersions or organic solutions. However, the acids may be omitted from these compositions with little deleterious effect. It should be pointed out that films coated with compositions that do not include the unsaturated acids are somewhat inferior in the degree of transparency. For this reason, it is preferred to include an unsaturated acid in both the sub- and top coating compositions.

The coatings may be applied in accordance with any known coating techniques. They may be applied by passing the film through baths in a continuous manner or in a batch manner. Coatings may also be sprayed onto the film, or applied manually by brushing or the like. The thickness of the coatings may be adjusted in accordance with methods well known in the coating art. Selection of the proper thicknesses of the top coating and the subcoating depend to some extent on the properties that one desires to emphasize. Thus, the thickness of the subcoating influences the strength and durability of the heat-seal and the durability of the film in general. The thickness of the top coating influences the permeability of the film to moisture and gases.

The films of this invention are used advantageously as moistureproof packaging materials for foods, cigarettes and the like. They are particularly useful where the packages must be shipped great distances. Their high flexibility and superior durability combine to make these packages able to withstand rough treatment. Furthermore, because of these superior properties the present films are outstanding as a vacuum and pressure packaging material, e. g., for packaging of luncheon meats, cheese, nuts, etc.

As many widely different embodiments can be made without departing from the scope of my invention, it is understood that the invention is not limited except as defined in the appended claims.

Having fully disclosed my invention I claim:

1. A packaging film comprising a base film of regenerated cellulose having at least one surface coated with a subcoating comprising a copolymer obtained from up to 70% of vinylidene chloride and 30–100% of an alkyl acrylate, wherein the alkyl group contains at least 2 carbon atoms and a top coating comprising a copolymer obtained from 80–97% vinylidene chloride and from 3–20% of at least one polymerizable mono-olefinic monomer copolymerizable with vinylidene chloride.

2. A packaging film comprising a base film of regenerated cellulose having at least one surface coated with a subcoating comprising a copolymer obtained from up to 70% vinylidene chloride and 30–100% of an alkyl acrylate, wherein the alkyl group contains at least 2 carbon atoms and 0.5–3% by weight, based on the total weight of the previous components, of an acid selected from the group consisting of itaconic acid, acrylic acid and methacrylic acid; and a top coating comprising a copolymer obtained from 80–97% vinylidene chloride and 3–20% of a copolymerizable monomer selected from the group consisting of acrylonitrile and alkyl acrylate.

3. A packaging film comprising a base film of regenerated cellulose having at least one surface coated with a subcoating comprising a copolymer obtained from up to 70% vinylidene chloride and 30–100% of an alkyl acrylate, wherein the alkyl group contains at least 2 carbon atoms and 0.5–3% by weight, based on the total weight of the previous components, of an acid selected from the group consisting of itaconic acid, acrylic acid and methacrylic acid; and a top coating comprising a copolymer obtained from 80–97% vinylidene chloride and 3–20% of an alkyl acrylate and 0.5–3% by weight, based on the total weight of vinylidene chloride and alkyl acrylate, of an acid selected from the group consisting of itaconic acid, acrylic acid and methacrylic acid.

4. A packaging film comprising a base film of regenerated cellulose having at least one surface coated with a subcoating comprising a copolymer obtained from 40–70% vinylidene chloride and 30–60% of an alkyl acrylate, wherein the alkyl group contains at least 2 carbon atoms and 0.5–3% by weight, based on the total weight of the previous components, of an acid selected from the group consisting of itaconic acid, acrylic acid and methacrylic acid; and a top coating comprising a copolymer obtained from 90–97% vinylidene chloride and 3–10% of an alkyl acrylate and 0.5–3% by weight, based on the total weight of vinylidene chloride and alkyl acrylate, of an acid selected from the group consisting of itaconic acid, acrylic acid and methacrylic acid.

5. A packaging film as in claim 1 wherein the copolymerizable monomer in the top coating is methyl acrylate.

6. A packaging film as is claim 1 wherein the copolymerizable monomer in the top coating is acrylonitrile.

7. A packaging film as in claim 1 wherein the alkyl acrylate in the subcoating is 2-ethylhexyl acrylate.

8. A packaging film as in claim 1 wherein the alkyl acrylate in the subcoating is isobutyl acrylate.

9. A process for preparing a packaging film which comprises coating a base film of regenerated cellulose with an aqueous dispersion containing a copolymer obtained from up to 70% vinylidene chloride, 30–100% alkyl acrylate wherein the alkyl group contains at least two carbon atoms and 0.5–3%, based on the total weight of vinylidene chloride and alkyl acrylate, of itaconic acid; drying the coated base film; applying to the dried coated film a second coating comprising an aqueous dispersion of a copolymer obtained from 80–97% vinylidene chloride, 3–20% alkyl acrylate and 0.5–3%, based on the total weight of vinylidene chloride and alkyl acrylate, of itaconic acid; and drying the twice-coated film.

10. A process for preparing a packaging film which comprises coating a base film of regenerated cellulose with a solution in an organic solvent of a copolymer obtained from 40–70% vinylidene chloride, 30–60% alkyl acrylate wherein the alkyl group contains at least two carbon atoms and 0.5–3%, based on the total weight of vinylidene chloride and alkyl acrylate, of itaconic acid; drying the coated base film; applying to the dried coated film a second coating comprising a solution in an organic solvent of a copolymer obtained from 90–97% vinylidene chloride, 3–10% alkyl acrylate and 0.5–3%, based on the total weight of vinylidene chloride and alkyl acrylate, of itaconic acid; and drying the twice-coated film.

11. A process for preparing a packaging film which comprises coating a base film of regenerated cellulose with a copolymer obtained from up to 70% vinylidene chloride and 30–100% of an alkyl acrylate wherein the alkyl group contains at least 2 carbon atoms in a suitable medium; drying the coated base film; applying to the dried coated film a second coating comprising a copolymer obtained from 80–97% vinylidene chloride and from 3–20% of at least one polymerizable mono-olefinic monomer copolymerizable with vinylidene chloride in a suitable medium; and drying the twice coated film.

12. A process as in claim 11 wherein at least one polymerizable mono-olefinic monomer copolymerizable with vinylidene chloride for use in the top coating is selected from the group consisting of acrylonitrile and alkyl acrylate.

References Cited in the file of this patent

UNITED STATES PATENTS 2,698,240    Alles et al.    Dec. 28, 1954

FOREIGN PATENTS 500,178    Canada    Feb. 23, 1954

U. S. DEPARTMENT OF COMMERCE
PATENT OFFICE
CERTIFICATE OF CORRECTION

Patent No. 2,819,984                                January 14, 1958

Hervey Winfield Ackerman, Jr.

It is hereby certified that error appears in the printed specification of the above numbered patent requiring correction and that the said Letters Patent should read as corrected below.

Column 7, lines 44 to 47, for the left-hand portion of the formula reading column 8, line 19, for "cellffiulose" read -- cellulose --.

Signed and sealed this 20th day of May 1958.

(SEAL)
Attest:

KARL H. AXLINE
Attesting Officer

ROBERT C. WATSON
Commissioner of Patents